US012789155B2

(12) United States Patent
Jiang et al.

(10) Patent No.: US 12,789,155 B2
(45) Date of Patent: Nov. 10, 2026

(54) FLOW FOCUSING TYPE ONE-STEP DOUBLE EMULSION DROPLET PARALLEL GENERATION DEVICE AND METHOD

(71) Applicant: Guangzhou University, Guangzhou (CN)

(72) Inventors: Fan Jiang, Guangzhou (CN); Haitao Huang, Guangzhou (CN); Meirong Chen, Guangzhou (CN); Haoxiang Huang, Guangzhou (CN); Yuqin Huang, Guangzhou (CN); Ju Yan, Guangzhou (CN)

(73) Assignee: Guangzhou University, Guangzhou (CN)

( * ) Notice: Subject to any disclaimer, the term of this patent is extended or adjusted under 35 U.S.C. 154(b) by 677 days.

(21) Appl. No.: 18/207,655

(22) Filed: Jun. 8, 2023

(65) Prior Publication Data

US 2023/0311087 A1 Oct. 5, 2023

Related U.S. Application Data

(63) Continuation of application No. PCT/CN2021/114999, filed on Aug. 27, 2021.

(30) Foreign Application Priority Data

Dec. 9, 2020 (CN) ......................... 202011428295.4

(51) Int. Cl.

| | |
|---|---|
| ***B01F 33/3011*** | (2022.01) |
| ***B01F 23/41*** | (2022.01) |
| ***B01L 3/00*** | (2006.01) |

(52) U.S. Cl.

CPC ...... *B01F 33/3011* (2022.01); *B01F 23/4105* (2022.01); *B01F 23/4143* (2022.01);

(Continued)

(58) Field of Classification Search

CPC ......................... B01F 23/4144; B01F 33/3011

See application file for complete search history.

(56) References Cited

U.S. PATENT DOCUMENTS

| | | | | |
|---|---|---|---|---|
| 10,532,357 | B1 | 1/2020 | Xia et al. | |
| 2012/0121481 | A1* | 5/2012 | Romanowsky ......... | B01F 23/41 137/561 R |
| 2016/0271610 | A1* | 9/2016 | Foulds ................. | B01F 23/811 |

FOREIGN PATENT DOCUMENTS

| | | |
|---|---|---|
| CN | 102585252 A | 7/2012 |
| CN | 106140340 A | 11/2016 |

(Continued)

OTHER PUBLICATIONS

Machine Translation of CN110787846A. Feb. 14, 2020. (Year: 2020).*

(Continued)

*Primary Examiner* — Stephen E Rieth

(57) ABSTRACT

A flow focusing type one-step double emulsion droplet parallel generation device and method. The device comprises a fluid injection module, a liquid droplet generation module, a liquid droplet surface solidification module and a liquid droplet collection module, wherein the fluid injection module is used for conveying fluid of each phase to the liquid droplet generation module; and the liquid droplet generation module comprises a fluid distribution functional area, a liquid droplet preparation functional area and an auxiliary functional arca, wherein the liquid droplet distribution functional area is used for conveying the fluid of each phase into a channel of the fluid of each phase corresponding to the liquid droplet preparation functional area, and the fluid of each phase is gathered at the same point in a flow focusing structure and then is broken, and a fluid of an outer phase covers the fluid of the middle phase.

9 Claims, 9 Drawing Sheets

(52) U.S. Cl.
CPC .... *B01F 23/4144* (2022.01); *B01L 3/502746* (2013.01); *B01L 2200/0636* (2013.01); *B01L 2300/0861* (2013.01); *B01L 2400/0406* (2013.01); *B01L 2400/086* (2013.01)

(56) References Cited

FOREIGN PATENT DOCUMENTS

| | | | |
|---|---|---|---|
| CN | 106215990 | A | 12/2016 |
| CN | 209406359 | U | 9/2019 |
| CN | 110787846 | A | 2/2020 |

OTHER PUBLICATIONS

International Search Report of PCT Patent Application No. PCT/CN2021/114999 issued on Nov. 16, 2021.

* cited by examiner

FLOW FOCUSING TYPE ONE-STEP DOUBLE EMULSION DROPLET PARALLEL GENERATION DEVICE AND METHOD

CROSS-REFERENCE TO RELATED APPLICATIONS

The present application is a continuation application of PCT application No. PCT/CN2021/114999 filed on Aug. 27, 2021, which claims the benefit of Chinese Patent Application No. 202011428295.4 filed on Dec. 9, 2020. The contents of all of the aforementioned applications are incorporated by reference herein in their entirety.

FIELD OF THE INVENTION

The present disclosure relates to a double emulsion-droplet preparation device and preparation method, in particular to, a flow focusing type one-step double emulsion droplet parallel generation device and a method.

BACKGROUND OF THE INVENTION

In recent years, as an important branch of the technical field of microfluidics, a droplet microfluidic technology has been widely used in biological, food, chemical, pharmaceutical, agricultural and other fields. Double emulsion droplets are highly structured fluid in dispersed phase droplets and wrap around smaller droplets. Intermediate phase droplets form a shielding layer around inner-phase droplets to isolate internal droplets from a continuous phase. The double emulsion droplets can be made into a capsule-like structure by means of solidifying the middle-phase droplets. By adjusting the natures of middle-phase fluid, the capsule-like structure can be broken in a specific environment to release inner-phase fluid.

A double emulsion droplet generation method is mainly divided into a two-step process and a one-step process. The two-step process has a relatively high requirement for the wettability of a wall surface of a flow channel, so that a flow channel between two flow focusing modules needs to be partially modified. The one-step process is flexible to control and has an extremely low requirement for the wettability of a wall surface of a flow channel. Meanwhile, double emulsion droplets with a thin middle part can be generated, and smaller droplets can be prepared. It is hard for the two-step process to form double emulsion droplets with a thin middle part. Current one-time formed structures mainly include a flow focusing confocal type structure and a coaxial ring tube type structure. The confocal type structure has a lower requirement for the machining accuracy, while the coaxial ring tube type structure has an extremely high requirement for the machining accuracy, making the manufacturing difficult.

A microfluidic technology is to control the fluid in a micro flow channel of a chip. A minimum flow channel is usually tens of microns in size, with high flow resistance, easy blockage, unreliable running, and low droplet output. In addition, a general double emulsion droplet generation chip has a complicated structure and is expensive, which restricts the mature application of this technology to industrialization. The specification of Chinese invention patent (publication number: CN106215990B) discloses a microfluidic module for large-scale preparation of droplets. The structure adopts a multi-level modular amplification policy. The module design includes two amplification processes: parallel amplification and stacking amplification. A fluid distribution layer of the structure adopts a narrow serpentine channel to ensure a fluid distribution effect, but the channel becomes longer and has high flow resistance, which increases pressures on an inlet and the channel. Moreover, when chipsets are stacked, serpentine distribution should be calculated and verified according to the criterion of achieving uniform fluid distribution, which increases the channel design and manufacturing difficulty. Therefore, it is in an urgent need to achieve a more stable and higher droplet output at low cost.

SUMMARY OF THE INVENTION

The present disclosure aims to overcome the shortcomings in the prior art and provide a flow focusing type one-step double emulsion droplet parallel generation device. The flow focusing type one-step double emulsion droplet parallel generation device can achieve a more stable and higher droplet output at a low cost, is flexible to control and simple in structure, has a low requirement on flow channel wettability, is convenient to manufacture, and can shorten the manufacturing time of microfluidic chips.

A second object of the present disclosure is to provide a method for the above flow focusing type one-step double emulsion droplet parallel generation device.

The technical solution of the present disclosure to solve the above technical problems is as follows:

A flow focusing type one-step double emulsion droplet parallel generation device includes a fluid injection module, a droplet generation module, a droplet surface solidification module, and a droplet collection module.

The fluid injection module is configured for conveying an inner-phase fluid, a middle-phase fluid and an outer-phase fluid, and includes an inner-phase fluid injection pump, a middle-phase fluid injection pump, and an outer-phase fluid injection pump.

The droplet generation module includes a fluid distribution functional region, a droplet preparation functional region, and an auxiliary functional region, wherein the auxiliary functional region is a cover plate; the fluid distribution functional region includes an inner-phase distribution layer, a middle-phase distribution layer, and an outer-phase distribution layer; and the droplet preparation functional region includes a droplet preparation layer.

The cover plate is provided with an inner-phase feed opening, a middle-phase feed opening, and an outer-phase feed opening, wherein the inner-phase feed opening, the middle-phase feed opening and the outer-phase feed opening are respectively communicated with the inner-phase fluid injection pump, the middle-phase fluid injection pump, and the outer-phase fluid injection pump through capillary tubes.

The inner-phase distribution layer includes an inner-phase inlet, an inner-phase outlet, and an inner-phase flow channel for communicating the inner-phase inlet with the inner-phase outlet; the middle-phase distribution layer includes a middle-phase inlet, a middle-phase outlet, and a middle-phase flow channel for communicating the middle-phase inlet with the middle-phase outlet; the outer-phase distribution layer includes an outer-phase inlet, an outer-phase outlet, and an outer-phase flow channel for connecting the outer-phase inlet with the outer-phase outlet, wherein the inner-phase inlet, the middle-phase inlet and the outer-phase inlet are respectively communicated with the inner-phase feed opening, the middle-phase feed opening and the outer-phase feed opening on the cover plate.

The droplet preparation layer is provided with a flow focusing structure; the flow focusing structure includes an inner-phase fluid inlet, a middle-phase fluid inlet, an outer-phase fluid inlet, a droplet outlet, and a preparation channel, wherein the inner-phase fluid inlet is communicated with the inner-phase outlet; the middle-phase fluid inlet is communicated with the middle-phase outlet; the outer-phase fluid inlet is communicated with the outer-phase outlet; the preparation channel includes an inner-phase fluid channel, a middle-phase fluid channel, and an outer-phase fluid channel, wherein the inner-phase fluid channel is configured for communicating the inner-phase fluid inlet with the droplet outlet; the middle-phase fluid channel and the outer-phase fluid channel are located on both sides of the inner-phase fluid channel, and are gathered with the inner-phase fluid channel at the same point; the inner-phase fluid, the middle-phase fluid and the outer-phase fluid are broken in a gathering area; the middle-phase fluid covers the inner-phase fluid, and the outer-phase fluid covers the middle-phase fluid, so as to generate double emulsion droplets; and the generated double emulsion droplets flow to the droplet outlet via the inner-phase fluid channel.

The droplet surface solidification module is configured for solidifying the surface of the double emulsion droplets.

The droplet collection module is configured for collecting the prepared double emulsion droplets; and the droplet collection module is communicated with the droplet outlet in the droplet preparation layer through a capillary tube.

Preferably, a plurality of groups of the flow focusing structures are provided, which are annularly arranged in parallel; correspondingly, a plurality of groups of the inner-phase outlets, middle-phase outlets and outer-phase outlets in the inner-phase distribution layer, the middle-phase distribution layer and the outer-phase distribution layer are provided; and the plurality of groups of inner-phase outlets, middle-phase outlets and outer-phase outlets are all in one-to-one correspondence to the inner-phase fluid inlets, the middle-phase fluid inlets and the outer-phase fluid inlets in the plurality of groups of focusing structures.

Preferably, the inner-phase outlet, the middle-phase outlet and the outer-phase outlet are respectively communicated with the corresponding inner-phase fluid inlet, middle-phase fluid inlet and outer-phase fluid inlet in the droplet preparation layer through vertical flow channels. The vertical flow channels include a plurality of through holes arranged in the inner-phase distribution layer, the middle-phase distribution layer and the outer-phase distribution layer; the corresponding through holes in the inner-phase distribution layer, the middle-phase distribution layer and the outer-phase distribution layer are communicated to form the vertical flow channels configured for communicating the inner-phase outlet with the inner-phase fluid inlet, communicating the middle-phase outlet with the middle-phase fluid inlet, and communicating the outer-phase outlet with the outer-phase fluid inlet.

Preferably, each of the inner-phase flow channel, the middle-phase flow channel and outer-phase flow channel includes two dispersed-phase fluid distribution functional regions and one continuous-phase fluid distribution functional region; planar flow channels of the inner-phase flow channel, the middle-phase flow channel and the outer-phase flow channel have a width of 1000 μm-2000 μm and a depth of 500 μm-1000 μm; each vertical flow channel has the same width as that of each planar flow channel; and neither of the vertical flow channel and the planar flow channel are coated.

Preferably, the preparation channel in the droplet preparation layer has a width of 20 μm-2000 μm and a depth of 20 μm-1000 μm; and a coating material for the droplet preparation layer is a hydrophobic material or an oleophobic material, which is selected according to the generated double emulsion droplets.

Preferably, the inner-phase fluid injection pump, the middle-phase fluid injection pump and the outer-phase fluid injection pump have the same structures, each of which includes an injection pump and one or more injectors; one or more injectors are mounted on the injection pump and are arranged in parallel; and outlets of the one or more injectors are communicated with the corresponding phase feed opening on the cover plate through a capillary tube.

Preferably, the droplet surface solidification module is an ultraviolet solidification device; and ultraviolet rays act on the capillary tube for connecting the droplet outlet in the droplet preparation layer to the droplet collection module.

Preferably, the capillary tube is a thin polytetrafluoroethylene tube.

Preferably, the inner-phase fluid channel in the flow focusing structure is perpendicular to the outer-phase fluid channel, and forms an included angle of 45° with the middle-phase fluid channel.

A method for the flow focusing type one-step double emulsion droplet parallel generation device includes the following steps:

S1. putting an inner-phase fluid, a middle-phase fluid and an outer-phase fluid into the inner-phase fluid injection pump, the middle-phase fluid injection pump and the outer-phase fluid injection pump of the fluid injection module respectively;

S2. controlling the inner-phase fluid injection pump, the middle-phase fluid injection pump and the outer-phase fluid injection pump to work independently to inject the inner-phase fluid, the middle-phase fluid and the outer-phase fluid into the inner-phase feed opening, the middle-phase feed opening and the outer-phase feed opening on the cover plate through the capillary tubes respectively;

S3. controlling the fluids of the various phases entering the cover plate to flow to corresponding spacer layers and into the corresponding fluid channels in the droplet preparation layer along flow channels in the corresponding spacer layer, wherein the inner-phase fluid entering from the inner-phase feed opening in the cover plate passes through the inner-phase inlet to the inner-phase distribution layer, flows along the inner-phase flow channel in the inner-phase distribution layer to the inner-phase outlet, and enters the inner-phase fluid channel through the inner-phase fluid inlet; the middle-phase fluid entering from the middle-phase feed opening in the cover plate passes through the middle-phase inlet to the middle-phase distribution layer, flows along the middle-phase flow channel in the middle-phase distribution layer to the middle-phase outlet, and enters the middle-phase fluid channel through the middle-phase fluid inlet; the outer-phase fluid entering from the outer-phase feed opening in the cover plate passes through the outer-phase inlet to the outer-phase distribution layer, flows along the outer-phase flow channel in the outer-phase distribution layer to the outer-phase outlet, and enters the outer-phase fluid channel through the outer-phase fluid inlet;

S4. controlling the inner-phase fluid entering the droplet preparation layer to flow along the inner-phase fluid channel, controlling the middle-phase fluid to flow along the middle-phase fluid channel, and controlling the outer-phase fluid to flow along the outer-phase fluid channel, wherein the inner-phase fluid, the middle-phase fluid and the outer-phase fluid are broken at the gathering part of the inner-phase fluid channel, the middle-phase fluid channel and the outer-phase fluid channel, so that the middle-phase fluid covers the inner-phase fluid, and the outer-phase fluid covers the middle-phase fluid to generate double emulsion droplets; and S5. after controlling the generated double emulsion droplets to pass through the droplet outlet along the inner-phase fluid channel, in the process that the double emulsion droplets flow into the droplet collection module via the capillary tubes, solidifying, by ultraviolet rays of the droplet surface solidification module, the surfaces of the double emulsion droplets, and collecting the double emulsion droplets through the droplet collection module after the surfaces of the double emulsion droplets are solidified.

Compared with the prior art, the present disclosure has the following beneficial effects.

(1) The one-step double emulsion droplet parallel generation device of the present disclosure adopts a flow focusing type confocal channel structure, so that double emulsion droplets with higher particle size uniformity and monodispersity can be generated. The size of the droplets can be flexibly controlled. When the confocal one-step process is used to generate double emulsion droplets, the double emulsion droplets with a middle part can be generated only by one flow focusing structure. Therefore, the structure is simple, and the double emulsion droplet generation rate is increased.

(2) The one-step double emulsion droplet parallel generation device of the present disclosure can achieve a more stable and higher droplet output at a low cost, is simple in structure, has a low requirement on flow channel wettability, is convenient to manufacture, and can shorten the manufacturing time of microfluidic chips.

(3) For a microchannel structure provided by the one-step double emulsion droplet parallel generation device of the present disclosure, a minimum channel can be designed to be a submillimeter level, which is applicable to various machining modes and has convenient machining, short period, low cost, easy batch production, reliable running, and little possibility of blockage. The device can be repeatedly used after being cleaned.

DETAILED DESCRIPTION OF THE EMBODIMENTS

Figure 1:
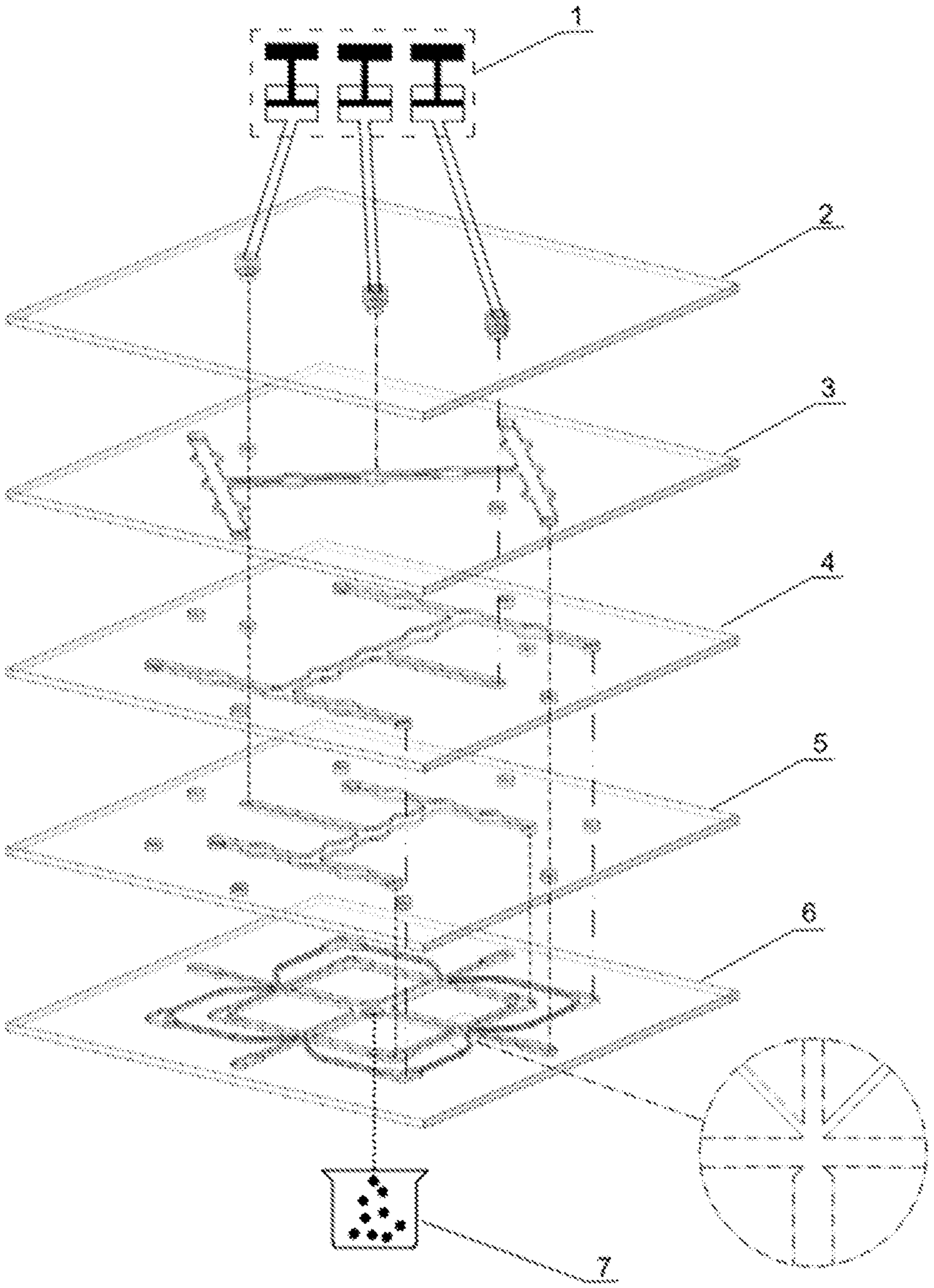
FIG. 1 is a schematic structural diagram of a flow focusing type one-step double emulsion droplet parallel generation device of the present disclosure. Three kinds of dashed lines in the figure represent flowing directions of three kinds of fluids, wherein the three kinds of dashed lines at feed openings respectively represent a flowing direction of an inner-phase fluid, a flowing direction of a middle-phase fluid and a flowing direction of an outer-phase fluid from left to right.
Figure 2:
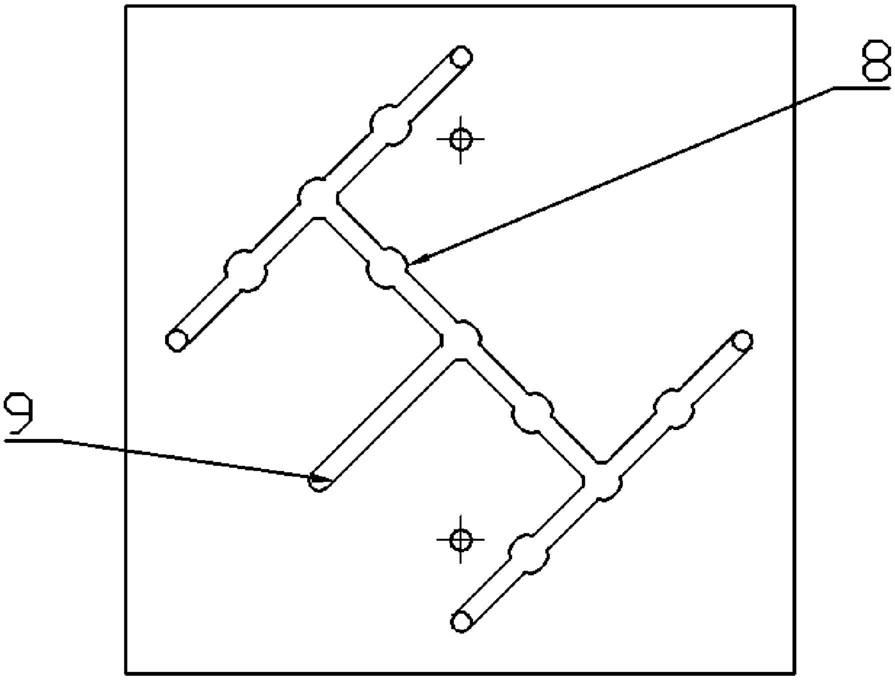
FIG. 2 is a schematic structural diagram of an inner-phase distribution layer.
Figure 3:
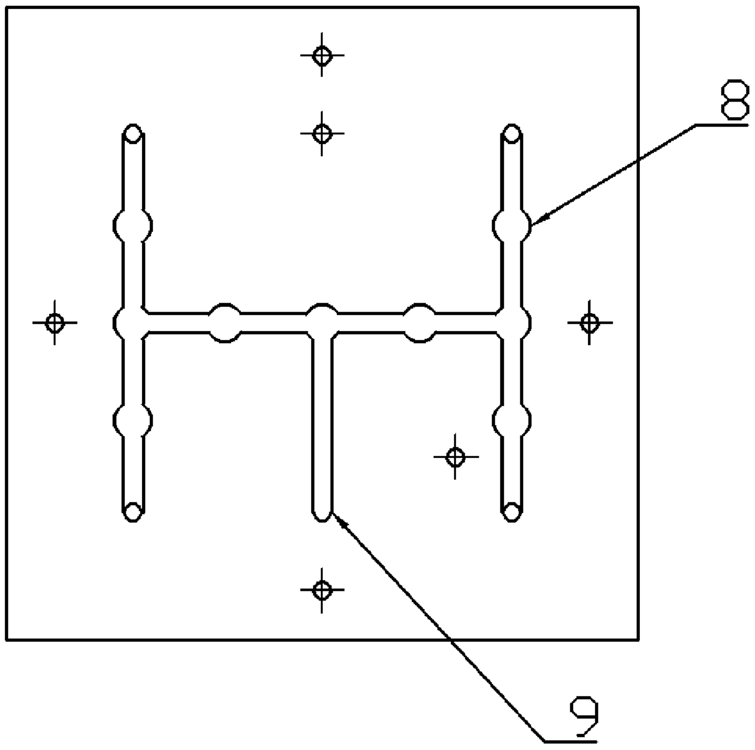
FIG. 3 is a schematic structural diagram of a middle-phase distribution layer.
Figure 4:
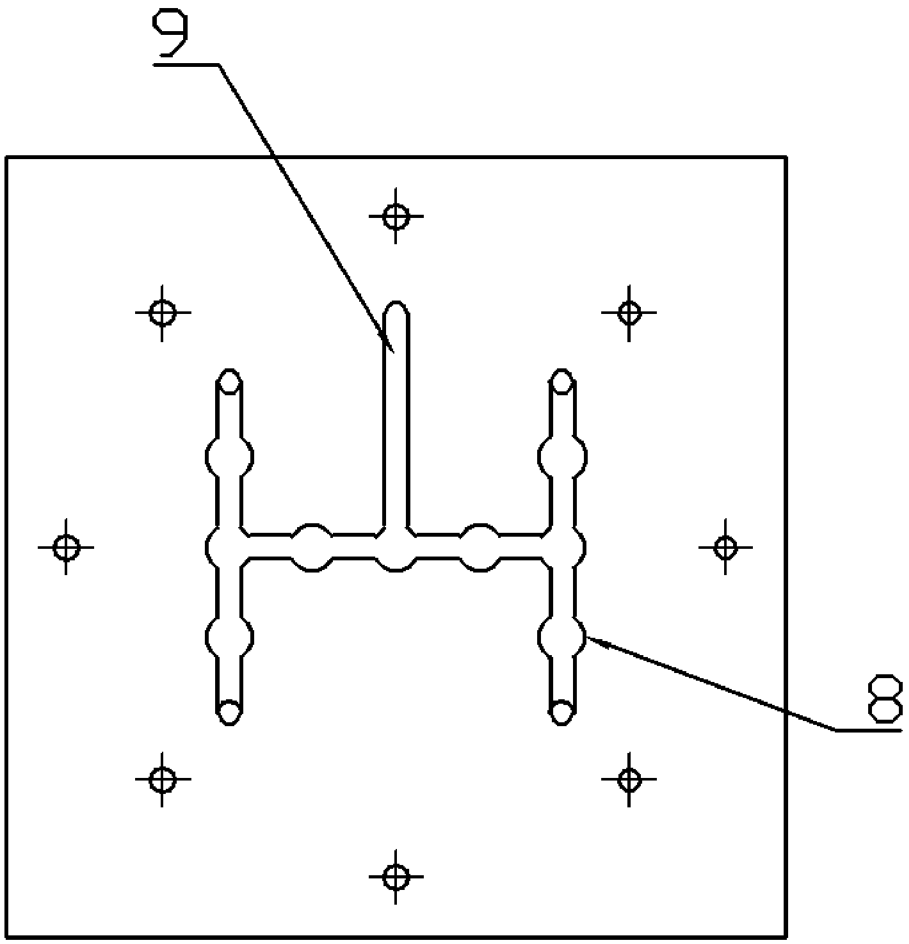
FIG. 4 is a schematic structural diagram of an outer-phase distribution layer.
Figure 5:
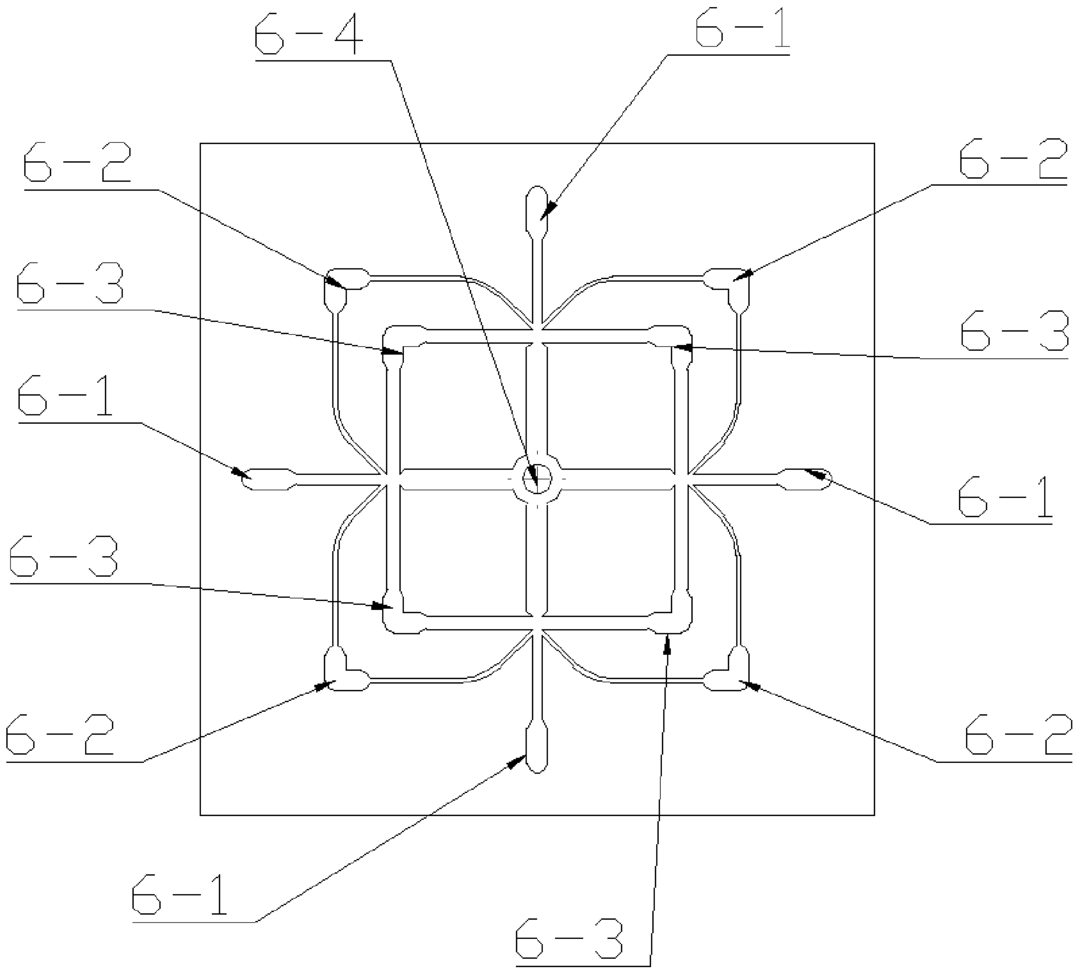
FIG. 5 is a schematic structural diagram of a droplet preparation layer.

The present disclosure is further described in detail below in combination with the embodiments and accompanying drawings, but the implementations of the present disclosure are not limited to this.

Referring to FIG. 1 to FIG. 7, a flow focusing type one-step-process double-emulsion droplet parallel generation device of the present disclosure includes a fluid injection module 1, a droplet generation module, a droplet surface solidification module, and a droplet collection module 7.

The fluid injection module 1 is configured for conveying an inner-phase fluid, a middle-phase fluid and an outer-phase fluid, and includes an inner-phase fluid injection pump, a middle-phase fluid injection pump, and an outer-phase fluid injection pump.

The droplet generation module includes a fluid distribution functional region, a droplet preparation functional region, and an auxiliary functional region. The auxiliary functional region is a cover plate 2. The fluid distribution functional region includes an inner-phase distribution layer 3, a middle-phase distribution layer 4, and an outer-phase distribution layer 5. The droplet preparation functional region includes a droplet preparation layer 6. The cover plate 2, the inner-phase distribution layer 3, the middle-phase distribution layer 4, the outer-phase distribution layer 5, and the droplet preparation layer 6 all have a thickness of 2 mm and a dimension of 130 mm×130 mm.

The cover plate 2 is provided with an inner-phase feed opening, a middle-phase feed opening, and an outer-phase feed opening. The inner-phase feed opening, the middle-phase feed opening and the outer-phase feed opening are respectively communicated with the inner-phase fluid injection pump, the middle-phase fluid injection pump, and the outer-phase fluid injection pump through capillary tubes.

The inner-phase distribution layer 3 includes an inner-phase inlet, an inner-phase outlet, and an inner-phase flow channel for communicating the inner-phase inlet with the inner-phase outlet. The middle-phase distribution layer 4 includes a middle-phase inlet, a middle-phase outlet, and a middle-phase flow channel for communicating the middle-phase inlet with the middle-phase outlet. The outer-phase distribution layer 5 includes an outer-phase inlet, an outer-phase outlet, and an outer-phase flow channel for communicating the outer-phase inlet with the outer-phase outlet. The inner-phase inlet, the middle-phase inlet and the outer-phase inlet are respectively communicated with the inner-phase feed opening, the middle-phase feed opening and the outer-phase feed opening on the cover plate 2.

The droplet preparation layer 6 is provided with a flow focusing structure. The flow focusing structure includes an inner-phase fluid inlet 6-1, a middle-phase fluid inlet 6-2, an outer-phase fluid inlet 6-3, a droplet outlet 6-4, and a preparation channel. The inner-phase fluid inlet 6-1 is communicated with the inner-phase outlet. The middle-phase fluid inlet 6-2 is communicated with the middle-phase outlet. The outer-phase fluid inlet 6-3 is communicated with the outer-phase outlet. The preparation channel includes an inner-phase fluid channel, a middle-phase fluid channel, and an outer-phase fluid channel. The inner-phase fluid channel is configured for communicating the inner-phase fluid inlet 6-1 with the droplet outlet 6-4. The middle-phase fluid channel and the outer-phase fluid channel are located on both sides of the inner-phase fluid channel, and are gathered with the inner-phase fluid channel at the same point; the inner-phase fluid, the middle-phase fluid and the outer-phase fluid are broken in a gathering area; the middle-phase fluid covers the inner-phase fluid, and the outer-phase fluid covers the middle-phase fluid, so as to generate double emulsion droplets; and the generated double emulsion droplets flow to the droplet outlet 6-4 via the inner-phase fluid channel.

The droplet collection module 7 is configured for collecting the prepared double emulsion droplets. The droplet collection module 7 is communicated with the droplet outlet 6-4 in the droplet preparation layer 6 through a capillary tube.

The droplet surface solidification module is an ultraviolet solidification device; and ultraviolet rays act on the capillary tube for connecting the droplet outlet in the droplet preparation layer to the droplet collection module.

Referring to FIG. 1 to FIG. 7, in this embodiment, the inner-phase distribution layer 3, the middle-phase distribution layer 4 and the outer-phase distribution layer 5 are arranged in different plane layers in a reasonable order, from top to bottom: the inner-phase distribution layer 3, the middle-phase distribution layer 4 and the outer-phase distribution layer 5. In this way, the flow channels of the various phase fluid distribution functional regions can be prevented from crossing or the various phase fluids can be prevented from being in contact with each other. The various phase fluid distribution functional regions adopt circular buffer areas 8 at multiple levels. After flowing from the central buffer area 9 through the circular buffer areas 8 at all levels along the various phase flow channels, the various phase fluids are distributed to the various phase fluid inlets of the droplet preparation functional region, thus ensuring uniform distribution of the microfluid, and achieving a simple structure and convenient machining. In addition, the central buffer areas 9 and the circular buffer areas 8 can be regarded as a portion of the various phase flow channels.

Referring to FIG. 1 to FIG. 7, a plurality of groups of the flow focusing structures are provided, which are annularly arranged in parallel. The plurality of groups of flow focusing structures are annularly connected in parallel into a chipset. Correspondingly, a plurality of groups of the inner-phase outlets, middle-phase outlets and outer-phase outlets in the inner-phase distribution layer 3, the middle-phase distribution layer 4 and the outer-phase distribution layer 5 are provided. The plurality of groups of inner-phase outlets, middle-phase outlets and outer-phase outlets are all in one-to-one correspondence to the inner-phase fluid inlets 6-1, the middle-phase fluid inlets 6-2 and the outer-phase fluid inlets 6-3 in the plurality of groups of focusing structures. Due to the use of the multiple parallel-connected groups of flow focusing structures, the impact of structural factors on the fluid distribution performance can be reduced, and the high monodispersity of the double emulsion droplets is ensured while the output is increased.

In this embodiment, there are four groups of flow focusing structures, corresponding to four groups of inner-phase outlets, middle-phase outlets and outer-phase outlets in the inner-phase distribution layer 3, middle-phase distribution layer 4 and outer-phase distribution layer 5. The inner-phase fluid channels in the flow focusing structures are perpendicular to the outer-phase fluid channels, and form an included angle of 45° with the middle-phase fluid channels.

Figure 6:
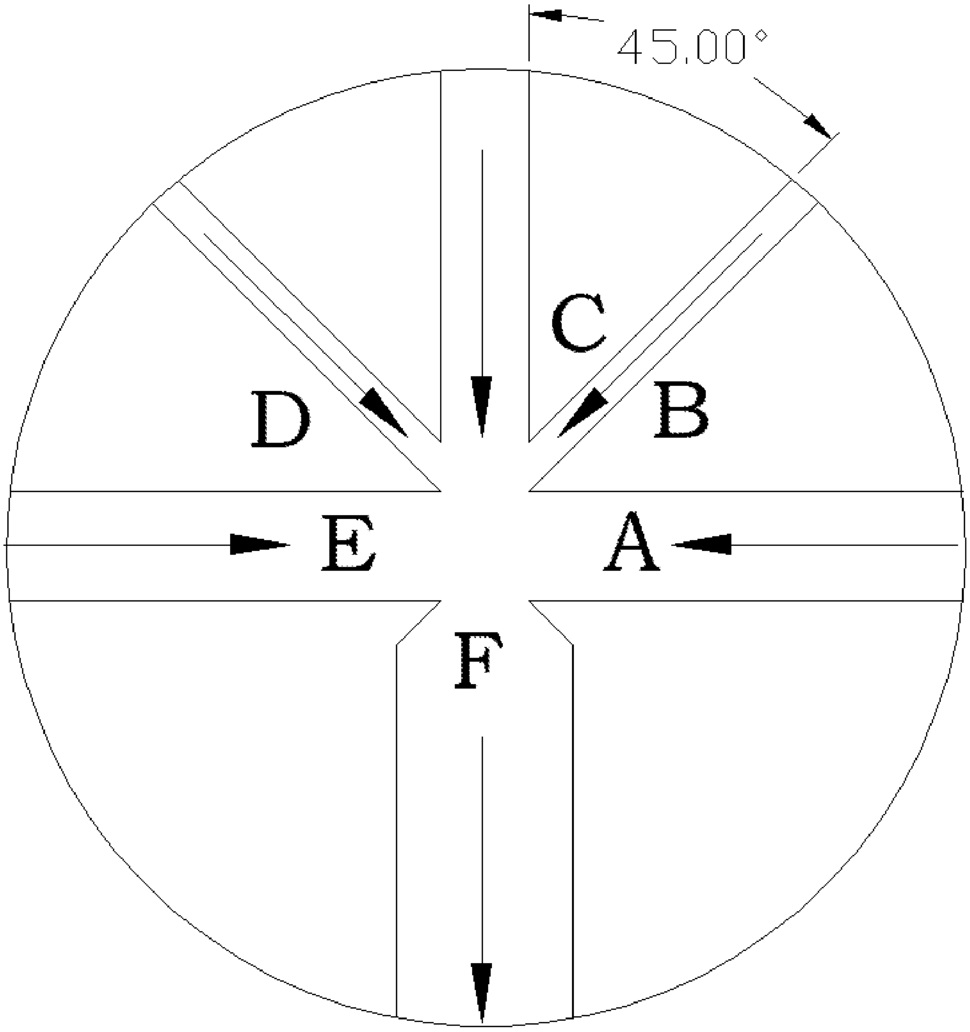
FIG. 6 is a schematic structural diagram of a flow focusing structure.

Referring to FIG. 6, each group of flow focusing structure is a five-in one-out hexa-connected symmetrical structure, including port A, port B, port C, port D, port E, and port F. Port C and port F are arranged along an axis of symmetry. Port A and port E are arranged symmetrically. Port B and port D are arranged symmetrically. Port A is perpendicular to the axis of symmetry, and an included angle between port B and the axis of symmetry is 45°. Due to the symmetric arrangement, the micro flow channels of the fluids of the same phase have the same length, which ensures that the fluids of the same phase can reach the flow focusing structure at the same time. Port C is the inner-phase fluid inlet 6-1. Port F is the droplet outlet 6-4. C and F form the inner-phase fluid channel. Port B and port D are the middle-phase fluid inlets 6-2, and B and D form the middle-phase fluid channel. Port A and port E are the outer-phase fluid inlets 6-3, and A and E form the outer-phase fluid channel.

In this embodiment, since four flow focusing structures are annularly connected in parallel in a circumferential direction of the droplet preparation layer 6, the outer-phase fluid enters from the outer-phase fluid inlet 6-3 flows through a three-way module to port A of one flow focusing structure and port E of another flow focusing structure. The middle-phase fluid entering from the middle-phase fluid inlet 6-2 flows through a three-way module to port B of one flow focusing structure and port D of another flow focusing structure. The inner-phase fluid entering from the inner-phase fluid inlet 6-1 flows from port C to port F of the flow focusing structure.

Referring to FIG. 1 to FIG. 7, the inner-phase outlet, the middle-phase outlet and the outer-phase outlet are respectively communicated with the corresponding inner-phase fluid inlet 6-1, middle-phase fluid inlet 6-2 and outer-phase fluid inlet 6-3 in the droplet preparation layer 6 through vertical flow channels. The vertical flow channels include a plurality of through holes arranged in the inner-phase distribution layer 3, the middle-phase distribution layer 4 and the outer-phase distribution layer 5. The corresponding through holes in the inner-phase distribution layer 3, the middle-phase distribution layer 4 and the outer-phase distribution layer 5 are communicated to form the vertical flow channels configured for communicating the inner-phase outlet with the inner-phase fluid inlet 6-1, communicating the middle-phase outlet with the middle-phase fluid inlet 6-2, and communicating the outer-phase outlet with the outer-phase fluid inlet 6-3.

In addition, the inlets of the various phases of the cover plate 2 are connected to the central buffer area 9 of the corresponding fluid distribution functional region through the vertical flow channels. That is, the inlets of the various phases of the fluid distribution functional region are arranged in the central buffer area 9, and the outlets of the various phases of the distribution functional regions of the fluids of the various phases are connected to the inlets of the fluids of the various phases in the droplet preparation functional region through the vertical flow channels. When the fluids flow through the central buffer area 9 with the distribution function for the fluids of the various phases and the inlets of the fluids of the various phases of the droplet preparation functional region, there is a high liquid phase resistance at a lower reach. Pressure changes caused by a height difference of different distribution layers can be ignored to achieve a more uniform fluid distribution in a vertical direction.

Referring to FIG. 1 to FIG. 7, the inner-phase fluid injection pump, the middle-phase fluid injection pump and the outer-phase fluid injection pump have the same structures, each of which includes an injection pump and one or more injectors. The one or more injectors are mounted on the injection pump and are arranged in parallel. The outlets of the one or more injectors are communicated with the corresponding phase feed opening on the cover plate 2 through a capillary tube. The number of parallel-connected modules is increased or decreased according to space utilization and relevant machining equipment conditions. The number of the parallel-connected droplet generation modules will not affect characteristic parameters of a product. A larger number of parallel-connected modules indicates a higher output and higher efficiency.

During operation, the injector is driven by the injection pump to inject the inner-phase fluid, the middle-phase fluid and the outer-phase fluid respectively into the inner-phase feed opening, the middle-phase feed opening and the outer-phase feed opening on the cover plate 2. The fluids of the various phases flow from the inlets of the various phases on the cover plate 2 to the central buffer area 9 of the corresponding fluid distribution functional region (the inner-phase distribution layer 3, the middle-phase distribution layer 4 and the outer-phase distribution layer 5) through the vertical flow channels. The fluids flow from the central buffer area 9 along the flow channels through the second-level circular buffer area 8 and the third-level circular buffer area 8 to the outlet of the fluid distribution functional region, and enter the inlets of the fluids of the various phases of the droplet preparation layer 6 through the vertical flow channels. In addition, the flow rate and velocity of fluid injection can be controlled through the injection pump.

Referring to FIG. 1 to FIG. 7, each of the inner-phase flow channel, the middle-phase flow channel and outer-phase flow channel includes two dispersed-phase fluid distribution functional regions and one continuous-phase fluid distribution functional region. Planar flow channels of the inner-phase flow channel, the middle-phase flow channel and the outer-phase flow channel have a width of 1000 μm-2000 μm and a depth of 500 μm-1000 μm; each vertical flow channel has the same width as that of each planar flow channel; and neither of the vertical flow channel and the planar flow channel are coated. In this way, the machining difficulty can be reduced, and the flow channels of the various phases or the vertical flow channels are hard to block when the fluids of the various phases flow in the flow channels of the various phases or the vertical flow channels, thus ensuring that the one-step double emulsion droplet parallel generation device of the present disclosure can be run more reliably.

Referring to FIG. 1 to FIG. 7, the preparation channel in the droplet preparation layer 6 has a width of 20 μm-2000 μm and a depth of 20 μm-1000 μm. A coating material for the droplet preparation layer 6 is a hydrophobic material or an oleophobic material. The coating materials of the inner-phase fluid channel, the middle-phase fluid channel and the outer-phase fluid channel of the droplet preparation layer 6 can be selected according to the natures of the generated double emulsion droplets, so as to reduce the liquid phase resistance. The flow channels of the various phases are hard to block when the fluids of the various phases flow in the flow channels of the various phases, thus ensuring that the one-step double emulsion droplet parallel generation device of the present disclosure can be run more reliably, and improving the reliability and service life of the device.

In this embodiment, the capillary tube is a thin polytetrafluoroethylene tube.

In addition, the droplet collection module 7 can also be a droplet surface solidification module, that is, the droplet collection module 7 also has a droplet surface solidification function.

Referring to FIG. 1 to FIG. 7, a method for the flow focusing type one-step double emulsion droplet parallel generation device of the present disclosure includes the following steps:

S1. An inner-phase fluid, a middle-phase fluid and an outer-phase fluid are respectively put into the plurality of parallel-connected injectors in the inner-phase fluid injection pump, the middle-phase fluid injection pump and the outer-phase fluid injection pump of the fluid injection module 1.

S2. The inner-phase fluid injection pump, the middle-phase fluid injection pump and the outer-phase fluid injection pump work independently to inject the inner-phase fluid, the middle-phase fluid and the outer-phase fluid into the inner-phase feed openings, the middle-phase feed openings and the outer-phase feed openings on the cover plates 2 of a plurality of parallel-connected droplet generation modules through the capillary tubes at a certain flow rate proportion.

S3. The fluids of various phases entering the cover plate 2 flow to corresponding spacer layers and into the corresponding fluid channels in the droplet preparation layer 6 along flow channels in the corresponding spacer layers, wherein the inner-phase fluid entering from the inner-phase feed opening in the cover plate 2 passes through the inner-phase inlet to the inner-phase distribution layer 3, flows along the inner-phase flow channel in the inner-phase distribution layer 3 to the inner-phase outlet, and enters the inner-phase fluid channel through the inner-phase fluid inlet 6-1; the middle-phase fluid entering from the middle-phase feed opening in the cover plate 2 passes through the middle-phase inlet to the middle-phase distribution layer 4, flows along the middle-phase flow channel in the middle-phase distribution layer 4 to the middle-phase outlet, and enters the middle-phase fluid channel through the middle-phase fluid inlet 6-2; the outer-phase fluid entering from the outer-phase feed opening in the cover plate 2 passes through the outer-phase inlet to the outer-phase distribution layer 5, flows along the outer-phase flow channel in the outer-phase distribution layer 5 to the outer-phase outlet, and enters the outer-phase fluid channel through the outer-phase fluid inlet 6-3.

S4. The inner-phase fluid entering the droplet preparation layer 6 flows directly through the inner-phase fluid channel (i.e. in the CF direction); the middle-phase fluid simultaneously arrives at port B and port D in two adjacent flow focusing structures through the symmetric middle-phase fluid channels after being divided by a three-way module; the outer-phase fluid simultaneously arrives at port A and port E in two adjacent flow focusing structures through the symmetric outer-phase fluid channels after being divided by a three-way module; the inner-phase fluid, the middle-phase fluid and the outer-phase fluid are broken at a gathering area of the flow focusing structure; the middle-phase fluid covers the inner-phase fluid, and the outer-phase fluid covers the middle-phase fluid to generate double emulsion droplets.

S5. after the generated double emulsion droplets pass through the droplet outlet 6-4 along the inner-phase fluid channel, in the process that the double emulsion droplets flow into the droplet collection module 7 via the capillary tubes, ultraviolet rays of the droplet surface solidification module solidify the surfaces of the double emulsion droplets, and the droplet collection module 7 collects the double emulsion droplets after the surfaces of the double emulsion droplets are solidified.

Figure 7:
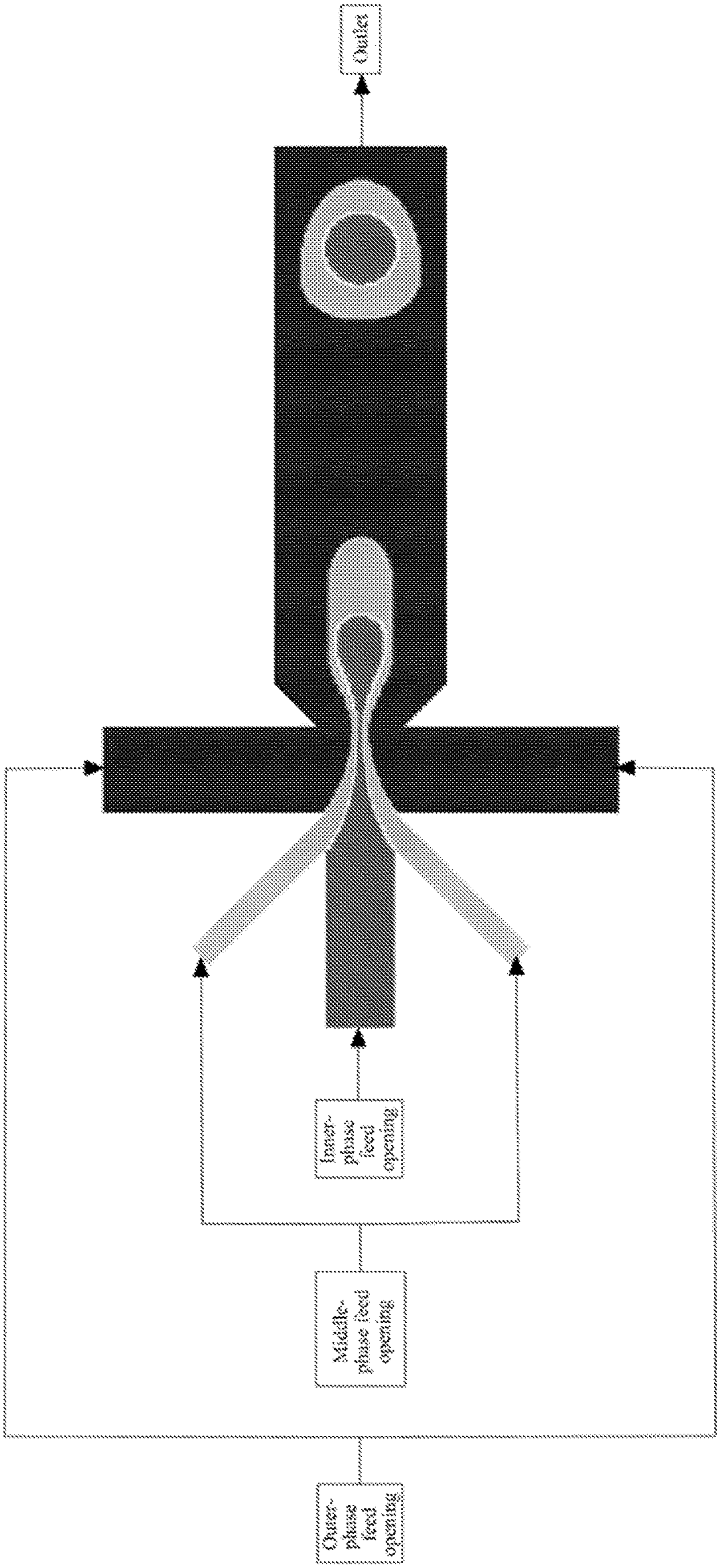
FIG. 7 is a schematic diagram of a simulation process of generating double emulsion droplets by a single preparation unit of the flow focusing type one-step double emulsion droplet parallel generation device.

Referring to FIG. 7, the one-step double emulsion droplet parallel generation device of the present disclosure produces W/O/W (water-oil-water) double emulsion droplets. The various fluid channels in the flow focusing structures all have rectangular cross sections. The micro flow channels may have unequal widths and depths. Any two of the inner-phase fluid, the middle-phase fluid and the outer-phase fluid contacting each other are not mixed with each other. Coating materials for the inner-phase fluid channel, the outer-phase fluid channel and the droplet outlet 6-4 adopt a hydrophobic material, and a coating material for the middle-phase fluid channel adopts an oleophobic material. The specific generation process may refer to FIG. 7. FIG. 7 is a simulated W/O/W type double emulsion droplet generation process.

Figure 8:
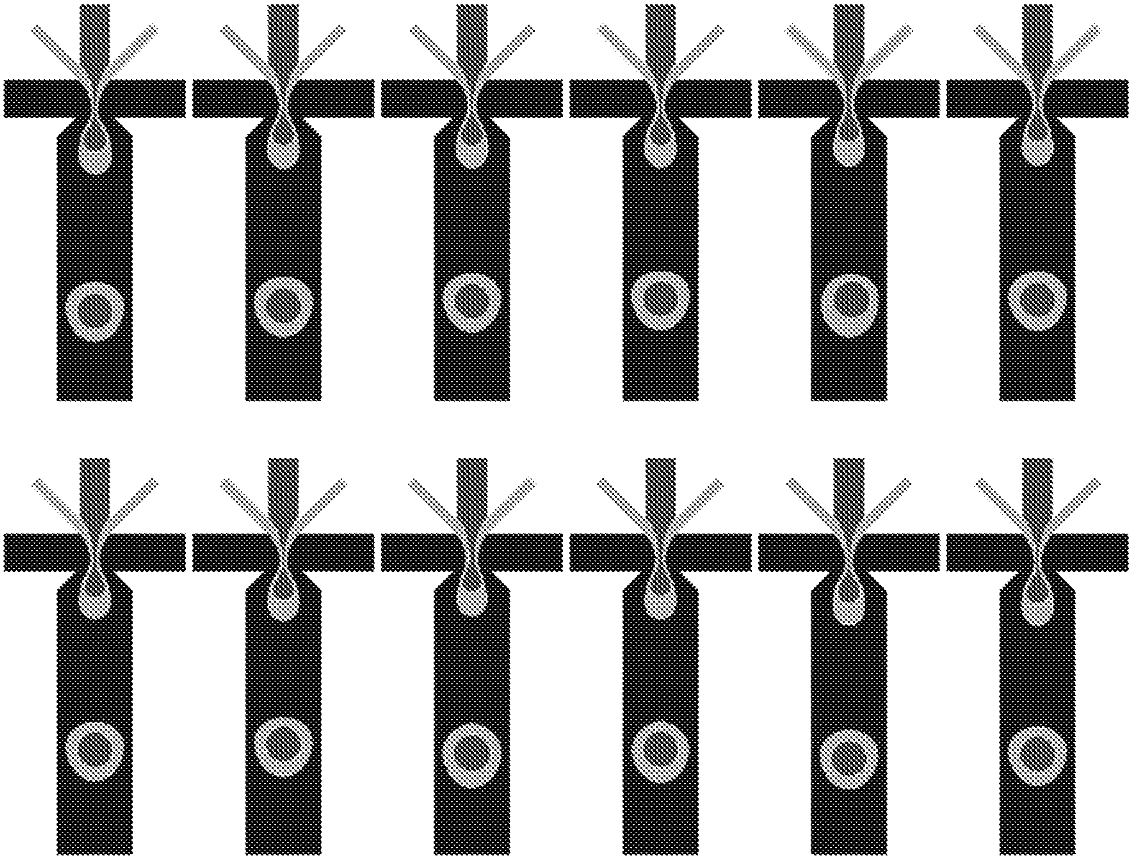
FIG. 8 is a simulated droplet generation diagram of twelve double emulsion droplets continuously generated by a single flow focusing structure.
Figure 9:
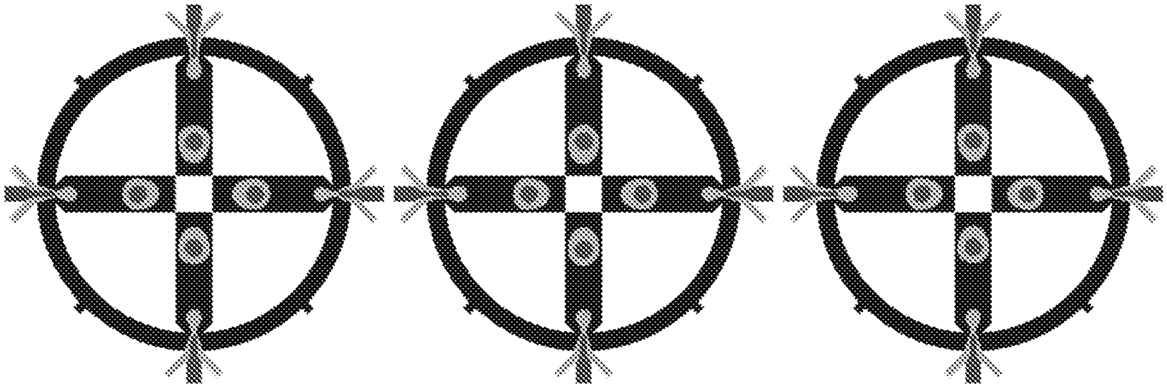
FIG. 9 is a simulated droplet generation diagram of twelve double emulsion droplets continuously generated by four annularly parallel-connected flow focusing structures.

Referring to FIG. 8 and FIG. 9, FIG. 8 is a simulated droplet generation diagram of twelve double emulsion droplets continuously generated by a single flow focusing structure. FIG. 9 is a simulated droplet generation diagram of twelve double emulsion droplets continuously generated by four annularly parallel-connected flow focusing structures.

In order to have a more comprehensive understanding of the one-step double emulsion droplet parallel generation device of the present disclosure, a single flow focusing structure and four annularly parallel-connected flow focusing structures are used for two-dimensional simulation contrast experiments. Physical property and flow rate parameters related to the inner phase, the middle phase and the outer phase are adjusted respectively, so that an intersection of each preparation channel is formed into a regular double emulsion droplet under the cutting of the fluid. The shapes of the double emulsion droplets change in the flow channels, and the diameters of the double emulsion droplets also change, but the internal and external areas of the double emulsion droplets are unchanged. Therefore, a CV value (a ratio of a standard deviation of a particle size distribution to its arithmetic mean) is not used to compare the uniformity of the double emulsion droplets, but an RSD (relative standard deviation) of the internal and external areas is used to compare the uniformity. ImageJ is used to calculate the internal and external areas (two-dimensional areas) of the double emulsion droplets. The region of the selected double emulsion droplets is decomposed into gray-scale images according to different colors, and inner and outer contours of the double emulsion droplets are determined respectively. Then, a ratio of an image size to an actual numerical value is determined using a scribing function, and the internal and external areas are extracted respectively through analyze. In order to obtain more accurate results, the first few double emulsion droplets generated are ignored, and the twelve double emulsion droplets continuously generated by the single flow focusing structure and the parallel-connected structures are taken to calculate the RSD of the internal and external areas of the double emulsion droplets respectively.

In a whole simulation experiment, the RSD of the internal area of the double emulsion droplets of the single flow focusing structure is 2.65%, and the RSD of the external area is 2.85%. The RSD of the internal area of the double emulsion droplets of the parallel-connected structures is 2.29%, and the RSD of the external area is 2.19%. The simulation results show that the uniformity of double emulsion droplets generated by the parallel-connected structures is greater than that of the double emulsion droplets generated by the single structure. Generally, the RSD of the double emulsion droplets generated by the confocal structure is less than 5%, which is in line with the reality.

The preferred implementations of the present disclosure are described above, but the implementations of the present disclosure are not limited by the above-mentioned content, and any other changes, modifications, substitutions, combinations, and simplifications that are made without departing from the spirit essence and principle of the present disclosure shall all be equivalent replacement methods, which all fall within the protection scope of the present disclosure.

The invention claimed is:

1. A flow focusing one-step double emulsion droplet parallel generation device, comprising a fluid injection module, a droplet generation module, a droplet surface solidification module, a droplet collection module, an inner-phase fluid, a middle-phase fluid, and an outer-phase fluid, wherein the fluid injection module is configured for conveying the inner-phase fluid, the middle-phase fluid and the outer-phase fluid to the droplet generation module, and comprises an inner-phase fluid injection pump, a middle-phase fluid injection pump, and an outer-phase fluid injection pump;

the droplet generation module comprises a fluid distribution functional region, a droplet preparation functional region, and an auxiliary functional region, wherein the auxiliary functional region is a cover plate; the fluid distribution functional region comprises an inner-phase distribution layer, a middle-phase distribution layer, and an outer-phase distribution layer; the droplet preparation functional region comprises a droplet preparation layer;

the cover plate is provided with an inner-phase feed opening, a middle-phase feed opening, and an outer-phase feed opening, wherein the inner-phase feed opening, the middle-phase feed opening and the outer-phase feed opening are respectively communicated with the inner-phase fluid injection pump, the middle-phase fluid injection pump, and the outer-phase fluid injection pump through capillary tubes;

the inner-phase distribution layer comprises an inner-phase inlet, an inner-phase outlet, and an inner-phase flow channel for communicating the inner-phase inlet with the inner-phase outlet; the middle-phase distribution layer comprises a middle-phase inlet, a middle-phase outlet, and a middle-phase flow channel for communicating the middle-phase inlet with the middle-phase outlet; the outer-phase distribution layer comprises an outer-phase inlet, an outer-phase outlet, and an outer-phase flow channel for communicating the outer-phase inlet with the outer-phase outlet, wherein the inner-phase inlet, the middle-phase inlet and the outer-phase inlet are respectively communicated with the inner-phase feed opening, the middle-phase feed opening and the outer-phase feed opening on the cover plate;

the droplet preparation layer is provided with a flow focusing structure; the flow focusing structure comprises an inner-phase fluid inlet, a middle-phase fluid inlet, an outer-phase fluid inlet, a droplet outlet, and a preparation channel, wherein the inner-phase fluid inlet is communicated with the inner-phase outlet; the middle-phase fluid inlet is communicated with the middle-phase outlet; the outer-phase fluid inlet is communicated with the outer-phase outlet; the preparation channel comprises an inner-phase fluid channel, a middle-phase fluid channel, and an outer-phase fluid channel, wherein the inner-phase fluid channel is configured for communicating the inner-phase fluid inlet with the droplet outlet; the middle-phase fluid channel and the outer-phase fluid channel are located on both sides of the inner-phase fluid channel, and are gathered with the inner-phase fluid channel at the same point; the inner-phase fluid, the middle-phase fluid and the outer-phase fluid are configured to be broken in a gathering area; the middle-phase fluid is configured to cover the inner-phase fluid, and the outer-phase fluid is configured to cover the middle-phase fluid, so as to be configured to generate double emulsion droplets; the double emulsion droplets are configured to flow to the droplet outlet via the inner-phase fluid channel;

the droplet surface solidification module is configured for solidifying the surface of the double emulsion droplets;

the droplet collection module is configured for collecting the double emulsion droplets; and the droplet collection module is communicated with the droplet outlet in the droplet preparation layer through a capillary tube.

2. The flow focusing one-step double emulsion droplet parallel generation device according to claim 1, wherein a plurality of groups of the flow focusing structures are provided, which are annularly arranged in parallel; correspondingly, a plurality of groups of the inner-phase outlets, middle-phase outlets and outer-phase outlets in the inner-phase distribution layer, the middle-phase distribution layer and the outer-phase distribution layer are provided; and the plurality of groups of inner-phase outlets, middle-phase outlets and outer-phase outlets are all in one-to-one correspondence to the inner-phase fluid inlets, the middle-phase fluid inlets and the outer-phase fluid inlets in the plurality of groups of focusing structures.

3. The flow focusing one-step double emulsion droplet parallel generation device according to claim 1, wherein the inner-phase outlet, the middle-phase outlet and the outer-phase outlet are respectively communicated with the corresponding inner-phase fluid inlet, middle-phase fluid inlet and outer-phase fluid inlet in the droplet preparation layer through vertical flow channels; wherein the vertical flow channels comprise a plurality of through holes arranged in the inner-phase distribution layer, the middle-phase distribution layer and the outer-phase distribution layer; the corresponding through holes in the inner-phase distribution layer, the middle-phase distribution layer and the outer-phase distribution layer are communicated to form the vertical flow channels configured for communicating the inner-phase outlet with the inner-phase fluid inlet, communicating the middle-phase outlet with the middle-phase fluid inlet, and communicating the outer-phase outlet with the outer-phase fluid inlet.

4. The flow focusing one-step double emulsion droplet parallel generation device according to claim 3, wherein each of the inner-phase flow channel, the middle-phase flow channel and outer-phase flow channel comprises two dispersed-phase fluid distribution functional regions and one continuous-phase fluid distribution functional region; planar flow channels of the inner-phase flow channel, the middle-phase flow channel and the outer-phase flow channel have a width of 1000 μm-2000 μm and a depth of 500 μm-1000 μm; each vertical flow channel has the same width as that of each planar flow channel; and neither of the vertical flow channel and the planar flow channel are coated.

5. The flow focusing one-step double emulsion droplet parallel generation device according to claim 3, wherein the preparation channel in the droplet preparation layer has a width of 20 μm-2000 μm and a depth of 20 μm-1000 μm; and a coating material for the droplet preparation layer is a hydrophobic material or an oleophobic material.

6. The flow focusing one-step double emulsion droplet parallel generation device according to claim 3, wherein the inner-phase fluid channel in the flow focusing structure is perpendicular to the outer-phase fluid channel, and forms an included angle of 45° with the middle-phase fluid channel.

7. The flow focusing one-step double emulsion droplet parallel generation device according to claim 1, wherein the inner-phase fluid injection pump, the middle-phase fluid injection pump and the outer-phase fluid injection pump have the same structures, each of which comprises an injection pump and one or more injectors, the one or more injectors are mounted on the injection pump and are arranged in parallel; and outlets of the one or more injectors are communicated with the corresponding phase feed openings on the cover plate through a capillary tube.

8. The flow focusing one-step double emulsion droplet parallel generation device according to claim 6, wherein the capillary tube is a thin polytetrafluoroethylene tube.

9. A method for the flow focusing one-step double emulsion droplet parallel generation device according to claim 1, comprising the following steps:

S1. putting an inner-phase fluid, a middle-phase fluid and an outer-phase fluid into the inner-phase fluid injection pump, the middle-phase fluid injection pump and the outer-phase fluid injection pump of the fluid injection module respectively;

S2. controlling the inner-phase fluid injection pump, the middle-phase fluid injection pump and the outer-phase fluid injection pump to work independently to inject the inner-phase fluid, the middle-phase fluid and the outer-phase fluid into the inner-phase feed opening, the middle-phase feed opening and the outer-phase feed opening on the cover plate through the capillary tubes respectively;

S3. controlling the fluids of the various phases entering the cover plate to flow to corresponding spacer layers and into the corresponding fluid channels in the droplet preparation layer along flow channels in the corresponding spacer layer, wherein the inner-phase fluid entering from the inner-phase feed opening in the cover plate passes through the inner-phase inlet to the inner-phase distribution layer, flows along the inner-phase flow channel in the inner-phase distribution layer to the inner-phase outlet, and enters the inner-phase fluid channel through the inner-phase fluid inlet; the middle-phase fluid entering from the middle-phase feed opening in the cover plate passes through the middle-phase inlet to the middle-phase distribution layer, flows along the middle-phase flow channel in the middle-phase distribution layer to the middle-phase outlet, and enters the middle-phase fluid channel through the middle-phase fluid inlet; the outer-phase fluid entering from the outer-phase feed opening in the cover plate passes through the outer-phase inlet to the outer-phase distribution layer, flows along the outer-phase flow channel in the outer-phase distribution layer to the outer-phase outlet, and enters the outer-phase fluid channel through the outer-phase fluid inlet;

S4. controlling the inner-phase fluid entering the droplet preparation layer to flow along the inner-phase fluid channel, controlling the middle-phase fluid to flow along the middle-phase fluid channel, and controlling the outer-phase fluid to flow along the outer-phase fluid channel, wherein the inner-phase fluid, the middle-phase fluid and the outer-phase fluid are broken at the gathering part of the inner-phase fluid channel, the middle-phase fluid channel and the outer-phase fluid channel, so that the middle-phase fluid covers the inner-phase fluid, and the outer-phase fluid covers the middle-phase fluid to generate double emulsion droplets; and S5. after controlling the double emulsion droplets to pass through the droplet outlet along the inner-phase fluid channel, in the process that the double emulsion droplets flow into the droplet collection module via the capillary tubes, solidifying, by the droplet surface solidification module, the surfaces of the double emulsion droplets, and collecting the double emulsion droplets through the droplet collection module after the surfaces of the double emulsion droplets are solidified.

* * * * *